Sept. 5, 1972   G. A. ROEDER ET AL   3,689,250
CONTROLLED SLAG FLOW IN AN ELECTRIC ARC FURNACE
Filed Oct. 31, 1969

INVENTORS.
GORDON A. ROEDER &
BY WILLIAM H. DAILEY

ATTORNEYS

United States Patent Office 3,689,250
Patented Sept. 5, 1972

3,689,250
CONTROLLED SLAG FLOW IN AN ELECTRIC ARC FURNACE
Gordon A. Roeder, Burlington, Ontario, Canada, and William H. Dailey, Solon, Ohio, assignors to The Steel Company of Canada Limited, Hamilton, Ontario, Canada, and Metallgesellschaft A.G., Frankfurt am Main, Germany
Filed Oct. 31, 1969, Ser. No. 872,960
Int. Cl. C21c 5/52; H05b 1/00
U.S. Cl. 75—12
8 Claims

ABSTRACT OF THE DISCLOSURE

A method of steelmaking in an electric arc furnace wherein a continuous slag cover in the regions of the arcs promotes better heat transfer conditions, and reduced energy consumption by inducing the slag to flow directly toward each arc with sufficient velocity and volume rates to carry the unmelted ingredients directly into the turbulent arc region. The slag flow is induced by gas jets aimed directly at the surface of the slag, or by injection of solid or fluid steelmaking ingredients with a sufficient horizontal velocity component radially inwardly toward each electrode to create a hump of flowing slag between the arc and the furnace enclosure to shield the furnace sidewall.

BRIEF SUMMARY OF THE INVENTION

This invention relates to a method of melting in an electric arc furnace and more particularly relates to continuously submerging the electric arcs in electric steelmaking furnaces by inducing slag flows radially inward from the furnace sidewall toward each arc.

The normal slag flow pattern in a multiphase electric arc furnace is generally radially outward from the magnetic center. In the normal 3-phase electric arc steelmaking furnace with electrodes arranged in a triangular configuration, the slag flow is outward around each electrode, thence radially toward the furnace wall, and finally inward between the electrodes toward the center of the furnace. This flag flow is induced by the direct mechanical action of the arcs striking the slag and by the flow of molten metal beneath the slag cover.

It has been observed that powerful electrical arcs can physically blast a portion of the slag cover away from the underlying molten steel or even vaporize the slag, thereby exposing the arcs with resulting serious refractory damage to the furnace walls and roof by direct radiation from the arcs. Also, displacement of the slag cover can result in increased localized nitrogen absorption by the metal bath.

Melting of iron, flux and other ingredient particles at the slag-metal interface and in the slag is limited by the rate and direction of slag flow. When the raw material charging rate exceeds a certain amount relative to the power input, the slag cools to become more viscous with the result that circulation slows and unmelted materials rapidly accumulate. Maintenance of slag temperature at the desired operating level limits the rate at which steelmaking ingredients can be melted and can necessitate excessive furnace operating temperatures to insure a sufficiently high slag temperature.

A method for the continuous charging of sponge iron and other particulate steelmaking ingredients into an electric arc furnace for substantially concurrent melting of the charge materials and refining of the bath leading to highly efficient steelmaking cycles with high productivities, as described in U.S. Letters Pat. Nos. 3,472,649 and 3,472,650 issued Oct. 14, 1969, is an illustration of recent developments in this field in an endeavor to overcome the foregoing problems. These patents teach, inter alia, the continuous charging of sponge iron by feeding the sponge iron through the furnace roof so that the sponge iron preferably drops into the flowing slag on the molten metal bath in proximity to the arc flare region. It has been observed, however, that the displacement or vaporization of the slag by the arcs obviates some of the benefits of this continuous charging process and it is a principal object of the present invention, therefore, to induce the slag of the molten bath within an electric arc steelmaking furnace to continuously bury and submerge the arcs from the electrodes.

It is another object of the present invention to create a circulation of the slag which not only promotes the maintenance of a continuous slag cover in the regions of the arcs but also promotes better heat transfer conditions.

It is a further object of the present invention to promote agitation within the molten bath and thus encourage mixing therein.

And it is another object of the present invention to relieve roof congestion commonly caused by the presence of a multiplicity of connecting devices such as feed pipes and the like heretofore necessary for continuous charging techniques.

And a further object of the present invention is to reduce energy consumption per unit of product and to increase productivity.

We have discovered that the objects of the invention may be achieved by inducing the slag to flow directly toward each arc with sufficient velocity and volume rates to carry the unmelted ingredients directly into the turbulent arc region. This greatly increases the melting capacity of the furnace and enables furnace operating temperatures to be reduced by about 100° C. compared to normal temperatures. This is particularly advantageous in enhancing rapid solution of slag-forming materials such as lime and dolomite.

The slag can be induced to flow toward the arcs by several means. It has been discovered that sufficient slag flow can be induced by gas jets aimed directly at the surface of the slag, or by injection of solid or fluid steelmaking ingredients with a sufficient horizontal velocity component in the proper direction, i.e. radially inwardly toward each electrode.

For example, in an electric arc furnace using a conventional batch charging process, the induced inward flow of slag (propelled by gases, by solid particles, or by a combination thereof) can be started as soon as the initial charge is sufficiently heated to form a molten region in proximity to each electrode. By this means a hump of flowing slag can be established and maintained between the arc and the furnace enclosure, effectively suppressing arc radiation to shield the furnace sidewall and greatly increasing the heat transfer between the arc and slag and metal. This procedure allows increased power input during the superheating and refining and increases the rate of the refining reactions.

In an electric arc furnace operating with part or all of the iron continuously charged in the form of iron bearing particles, the melting portion of the cycle and part or all of the refining cycle can be carried out at a temperature substantially below tap temperature (e.g. 2850° F.) and, after completion of charging of all or substantially all of the refining ingredients, the induced inward flow of slag can be used to maintain a hump of flowing slag between each electrode and the furnace enclosure, thereby effectively suppressing arc radiation and greatly increasing heat transfer between the arc and the slag and metal and allowing continued high power input until the metal is hot enough to be tapped.

The term "hump" is understood to mean elevation of the surface of the slag above the normal bath surface. Normally the level of the slag surface in the immediate vicinity of each electrode on the outer periphery of the electrode circle in a three-phase arc furnace is below the level of the surface of the surrounding slag. The induced inward flow will raise the level of this depressed slag surface. The raised surface of the hump may still be below the surface level of the surrounding slag, although the raised surface is normally maintained at or above the surrounding slag surface.

The objects of the invention and the advantages arising therefrom will become obvious from the following detailed description of the drawing, in which:

DETAILED DESCRIPTION OF THE INVENTION

Figure 1:
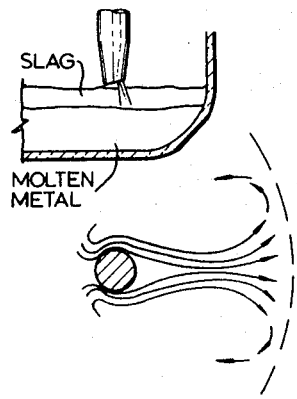
FIG. 1 is a schematic illustration of a conventional slag flow pattern.

Like reference characters refer to like parts throughout the description of the drawings.

Figure 2:
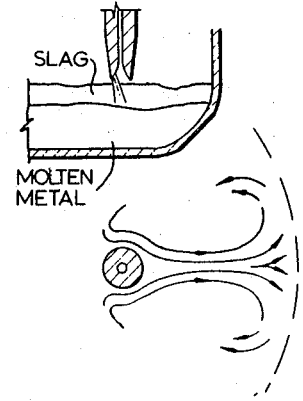
FIG. 2 is a schematic illustration of a slightly different conventional slag flow pattern.
Figure 3:
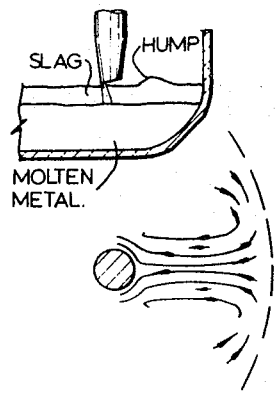
FIG. 3 is a schematic illustration of the reverse slag pattern achieved by the practice of the method of the present invention.

With particular reference to FIGS. 1 and 2, known techniques are shown in FIGS. 1 and 2 wherein slag flow is indicated to be predominantly radially outward about the electrode toward the furnace sidewall. FIG. 3 indicates the reverse flow achieved by the practice of the present invention as will be described in detail below, i.e. an inward slag flow generally from the furnace sidewall toward the electrode to provide the heretofore-described hump for shielding purposes.

Figure 4:
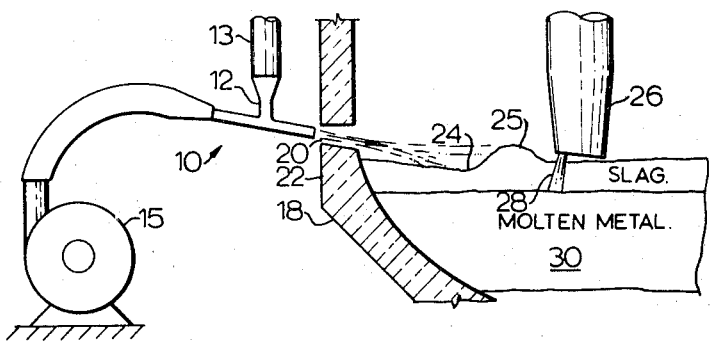
FIG. 4 is an elevation, partly in section, taken along line 4—4 of FIG. 5 showing the injection of sponge iron into an electric arc steelmaking furnace.
Figure 5:
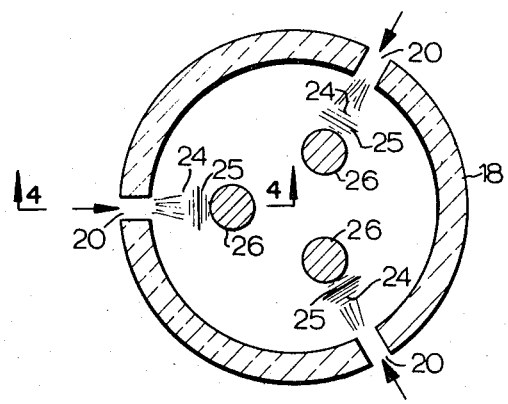
FIG. 5 is a plan view of an electric arc furnace having a plurality of radial injectors.

With reference now to FIGS. 4 and 5 of the drawings, injector 10 having venturi gate 12, pellet inlet 13 and a supply of air under pressure by blower 15 is shown to supply pellets carried by an air blast into the furnace 18 through apertures 20 formed in the upper sidewall 22 of the furnace. The injected pellets impact the slag cover at a region designated generally by numeral 24 to advance the slag inward toward each of the electrodes 26 to form humps 25 which substantially continuously bury the electric arcs 28 struck between the electrode tips and the melt 30 and thereby shield the furnace sidewall 22 from direct radiation of the arcs.

The following two heats, utilizing 29.0%, and 33.0% by weight sponge iron pellets respectively, having the analysis as indicated in Table I, illustrate an embodiment of the operation of the method of the invention utilizing a propulsion gas jet.

The heats were conducted in a 25 ton furnace having a shell diameter of 11 feet, electrode diameter of 12 inches and powered by an 8000 kva. transformer.

TABLE I.—ANALYSIS OF SPONGE IRON PELLETS

| | Percent by wt. |
|---|---|
| Total iron | 89.50 |
| Metallic iron | 87.40 |
| Ferrous iron | 1.70 |
| $SiO_2$ | 5.50 |
| S | 0.010 |
| C | 0.22 |

Continuous charging metallurgical and furnace practice as described in Pat. Nos. 3,472,649 and 3,472,650 was followed with the use of the method of the present invention wherein an injector fed sponge iron pellets to one electrode phase.

Heat No. 1

This heat was made with the blower damper fully opened, and the venturi gate on the injector half-opened for optimum performance. An early boil in the heat removed most of the initial slag from the bath causing the furnace to operate roughly with unstable intermittent arc as observed by the "barking" and "spitting" from the arcs. Since the slag depth was negligible the arcs were completely exposed, and, the injected pellets ricocheted from the metal surface and bounced against the electrodes and throughout the furnace. Little bath movement was evident. However, as the slag from the gangue in the pellets gradually accumulated, the operation became very smooth. The slag in the path of the injected pellets (and air under these test conditions) moved at a relatively high velocity toward the arc at each electrode, around the electrode and then back toward and around the sidewall. This circulating movement was very pronounced. A boil late in the heat again removed the slag from the furnace, baring the arcs and leading to poor operating conditions.

It was quite apparent from this heat that the presence of a considerable amount of slag is desirable for optimum operation of the process. When the slag was deep, about 4 inches minimum, directional movement of the slag toward the arc and the overall stirring was very rapid.

Heat No. 2

The slag circulation was initiated as soon as the injection started, and continued at a rapid rate throughout the heat. No slag flushes were generated so that a deep fluid slag was maintained for the entire heat. The slag movement toward the electrode was sufficiently strong to turn the arc downward and inward, a desirable condition. The slag circulated about the furnace periphery at a rate estimated to be about 25 ft./min. or approximately one revolution/min. in the size of furnace used for the test heats. The slag movement in the injection path was much more rapid at a rate estimated to be about 60 ft./min.

It may be seen from these examples that the arcs were well buried by the onrushing slag. Furthermore, in Heat No. 2, the energy consumption of 480 kwh./ton was the lowest ever achieved in the test furnace for pellet-fed heats without the use of supplemental oxygen. This is an indication of the improved heat transfer conditions brought about by the method of the invention as will be evident from Table II as follows:

TABLE II.—ENERGY CONSUMPTION

| | Energy (kwh./ton steel) |
|---|---|
| Typical all-scrap heat | 575 |
| Typical heat made with ~70% sponge, gravity feed | 555 |
| Typical heat made with ~30% sponge, gravity feed | 508 |
| Heat No. 2 using gas propulsion injection | 480 |

Although the previous description has proceeded with reference to the injection of sponge iron pellets to direct the slag toward the arc flare region, other materials and methods for causing desired slag flow can be utilized. Other discrete iron-bearing materials such as briquettes, granules, punchings, borings, fragmentized scrap and the like can be used in the process of the invention and it will be understood that the term "discrete, iron-bearing materials" is intended to encompass the foregoing iron-bearing materials. Furthermore, it will be understood that the other steelmaking ingredients such as fluorspar, lime, iron-oxide, carbon, alloying materials and the like can also be employed in the process.

It has been discovered that sufficient slag flow can be induced by gas jets alone directed at the surface of the slag, as well as by injection of solid steelmaking ingredients, by using a sufficient horizontal velocity component directed toward the arc flare region. A simple method giving good results is to inject a stream of cold or preheated air from the sidewall of the furnace directed at the slag at a region between the wall and each electrode. Solid steelmaking ingredients can be fed by gravity such as through the furnace roof into the region of the slag at or between the area of impact of each air jet and each electrode.

A third embodiment of the method, which does not introduce air or other gases into the furnace, is to accelerate the ingredients by mechanical or magnetic devices and to inject them in the desired direction.

We claim:

1. A method for directing the slag flow in a multiphase electric arc furnace having therein molten iron with a slag cover and an electrode having an arc in an arc flare region comprising the injecting of materials inward directly toward said electrode from the furnace sidewall at an acute angle relative to the slag cover and at a region between the furnace sidewall and electrode such that the said injected material causes the slag to flow generally toward the electrode arc flare region with sufficient velocity and volume rates to substantially shield the furnace sidewall from the arc by raising of said slag to form a hump.

2. A method as claimed in claim 1 in which said materials are steelmaking ingredients such as discrete iron-bearing material fluorspar, lime, iron-oxide, carbon and alloying materials.

3. A method as claimed in claim 1 in which one of said injected materials is a fluid material.

4. A method as claimed in claim 3 in which the fluid material is air.

5. A method as claimed in claim 1 in which the injected materials are introduced through the furnace sidewall.

6. A method as claimed in claim 3 in which steelmaking ingredients are introduced to the furnace in the region between the furnace sidewall and arc flare region where the injected fluid material strikes the slag cover whereby said steelmaking ingredients are carried directly into the arc flare region.

7. A method as claimed in claim 6 in which steelmaking ingredients are introduced to the furnace through the furnace roof.

8. A method as claimed in claim 1 in which the slag movement is caused by directing a stream of air of desired temperature from the furnace sidewall at the slag in a region between the furnace sidewall and arc flare region.

References Cited

UNITED STATES PATENTS

| | | | |
|---|---|---|---|
| 2,681,275 | 6/1954 | Lubatti | 75—11 |
| 3,153,588 | 10/1964 | Madaras | 75—12 |
| 3,223,520 | 6/1965 | Ostberg | 75—12 |
| 3,372,223 | 3/1968 | Menegoz | 13—9 |
| 3,264,094 | 8/1966 | Robinson | 75—11 |
| 3,396,954 | 8/1968 | Krogsrud | 13—9 |
| 3,406,241 | 10/1968 | Robinson | 13—9 |
| 3,459,867 | 8/1969 | Estes | 13—9 |

WINSTON A. DOUGLAS, Primary Examiner

P. D. ROSENBERG, Assistant Examiner

U.S. Cl. X.R.

13—35; 75—11, 95; 266—43